(No Model.)
V. RATTAN.
FRUIT GRADER.
No. 399,779. Patented Mar. 19, 1889.
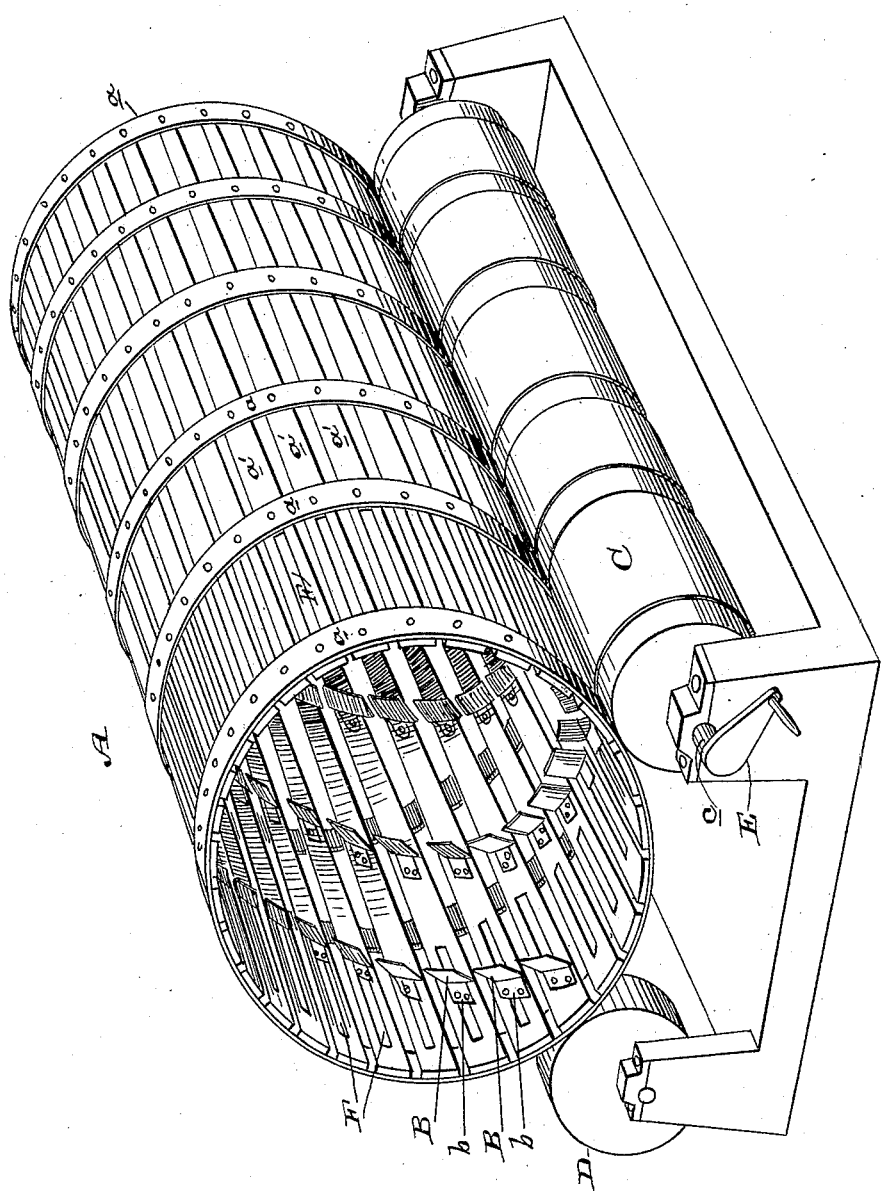
Witnesses,
Geo. H. Strong.
J. H. Tourke.
Inventor,
Volney Rattan
By Dewey & Co.
attys

UNITED STATES PATENT OFFICE.

VOLNEY RATTAN, OF SAN FRANCISCO, CALIFORNIA.

FRUIT-GRADER.

SPECIFICATION forming part of Letters Patent No. 399,779, dated March 19, 1889.

Application filed December 4, 1888. Serial No. 292,660. (No model.)

*To all whom it may concern:*

Be it known that I, VOLNEY RATTAN, of the city and county of San Francisco, State of California, have invented an Improvement in Fruit-Graders; and I hereby declare the following to be a full, clear, and exact description of the same.

My invention relates to the class of machines which are used for grading fruits of all kinds according to size; and my invention consists in the constructions and combinations of devices which I shall hereinafter fully describe and claim.

The figure is a perspective view of my machine.

The object of my machine is to provide a simple and effective machine for grading fruit.

A is a hollow cylinder or barrel made up of a suitable number of circumferential hoops or bands, $a$, and longitudinally-extending slats or bars $a'$, which constitute its periphery. These slats or bars are separated and the spaces between them are less in width at one end of the cylinder or barrel than at the other, this being obtained in any suitable manner, as by making one end of the cylinder larger in diameter than the other end, or, as I prefer to do, making the slats or bars themselves tapering, as shown.

B are flanges, of a shape shown, said flanges having bases $b$, by which they are adapted to be screwed or bolted down to the slats or bars of the cylinder or barrel. These flanges are placed upon the inner surface of the slats or bars and are arranged in a spiral course throughout the interior from one end to the other. The cylinder or barrel has no central shaft forming an axle, but is supported directly upon the roll or drum C on one side of its base and the rollers or wheels D on the other side of its base. The roll or drum C is made of a length equal to that of the cylinder or barrel, and its axle $c$ is provided with a crank, E, whereby rotation is imparted to it, and said roll or drum by frictional contact with the periphery of the cylinder or barrel imparts a rotary motion to the latter. This roll or drum, in addition to serving as a driver, has the primary function of clearing the spaces between the slats or bars from the fruit which has a tendency to stick between them. This is done by said roll or drum merely pressing against the fruit as it comes around and presents its projecting surface to the surface of the roller or drum, and the fruit being thus pressed backward is gently and effectively freed from the slats or bars and given an opportunity to move along to the discharge. A very slow movement is necessary for the cylinder or barrel in order to prevent the fruit from being carried around with it, and this is gained by imparting rotation to it through the roll or drum C instead of directly.

The operation of the machine is as follows: The fruit is fed in at that end of the cylinder or barrel at which the spaces between the slats or bars have the least width; but these spaces may be increased in number by making the slits or openings F for a short distance in the slats or bars, and having a width about the same as the space between the bars, whereby at the beginning of the operation a general outlet of greater capacity is afforded for the smallest fruit. The main cylinder or barrel being rotated, the fruit is carried along from one end to the other by means of the spirally-arranged flanges B, and as the fruit of a proper size arrives at a place where the space between the slats is wide enough it drops through, and the sorting or grading is thus continued throughout the length of the cylinder or barrel. The fruit which has a tendency to stick between the slats or bars is pushed back by contact with the clearing roll or drum C. The slow movement of the main cylinder or barrel does not permit the fruit being carried upwardly and dropped, and the position of the roll or drum C prevents the fruit which sticks between the slats or bars from passing it and from gaining any elevation, and thus the most tender fruit may be properly handled and graded in this machine.

Having thus described my invention, what I claim as new, and desire to secure by Letters Patent, is—

1. In a fruit-grader, a hollow rotating cylinder or barrel having its periphery composed of longitudinal separated slats or bars of tapering form throughout, whereby the spaces between said slats or bars gradually increase in width from one end to the other, in combination with the independent guide-flanges secured separately to the inner surface of each slat or bar and arranged in a spiral course throughout the length of the cylinder or barrel, substantially as described.

2. In a fruit-grader, a hollow rotating cylinder or barrel having its periphery composed of longitudinal separated slats or bars the spaces between which gradually increase in width from one end to the other, in combination with an exterior rotating clearing drum or roll of uniform diameter throughout extending along the hollow cylinder or barrel and in contact with its periphery for pushing back the fruit which sticks between the slats, substantially as herein described.

3. In a fruit-grader, a hollow cylinder or barrel having its periphery composed of longitudinal separated slats or bars leaving interspaces which gradually increase in width from one end to the other, and the spirally-arranged flanges upon the inner surface of said slats or bars, in combination with the supporting rollers or wheels on one side and the frictional driving and clearing drum or roll on the other side, substantially as herein described.

In witness whereof I have hereunto set my hand.

VOLNEY RATTAN.

Witnesses:
JAS. TOBIN,
J. H. BLOOD.